(12) United States Patent
Bernstein

(10) Patent No.: US 7,322,556 B2
(45) Date of Patent: Jan. 29, 2008

(54) PINCH VALVE FOR REGULATING FLUID FLOW

(76) Inventor: Robert E. Bernstein, 8 Merriam Rd., Framingham, MA (US) 01701

( * ) Notice: Subject to any disclaimer, the term of this patent is extended or adjusted under 35 U.S.C. 154(b) by 0 days.

(21) Appl. No.: 11/222,055

(22) Filed: Sep. 8, 2005

(65) Prior Publication Data

US 2007/0051909 A1    Mar. 8, 2007

(51) Int. Cl.
*F16K 7/04* (2006.01)
(52) U.S. Cl. .............................. 251/6; 251/4
(58) Field of Classification Search .............. 251/4, 251/6, 7; 417/478, 479, 510
See application file for complete search history.

(56) References Cited

U.S. PATENT DOCUMENTS

| | | | | |
|---|---|---|---|---|
| 1,858,352 A | * | 5/1932 | Young | 251/1.1 |
| 3,102,710 A | * | 9/1963 | Dresden | 251/9 |
| 4,682,755 A | * | 7/1987 | Bernstein et al. | 251/4 |
| 5,372,350 A | * | 12/1994 | Kawabe | 251/4 |
| 5,462,251 A | * | 10/1995 | Kawabe | 251/4 |
| 5,573,223 A | * | 11/1996 | Kawabe | 251/4 |
| 6,957,798 B1 | * | 10/2005 | Schmidt | 251/6 |

* cited by examiner

*Primary Examiner*—Eric Keasel
*Assistant Examiner*—John K. Fristoe, Jr.
(74) *Attorney, Agent, or Firm*—Lawrence S. Cohen

(57) ABSTRACT

A pinch valve for regulating fluid flow includes a close mechanism for closing a sleeve by pinching its sides together. The pinch valve also includes an open mechanism integral with the close mechanism for opening the tube by urging the sides apart. The open mechanism pushes against the ends of the closure in the sleeve as the tube is being opened. In one embodiment of the invention open cams push against the end of the closure, and in another embodiment open followers, which are part of a four bar linkage, push against the sides of the sleeve.

1 Claim, 12 Drawing Sheets

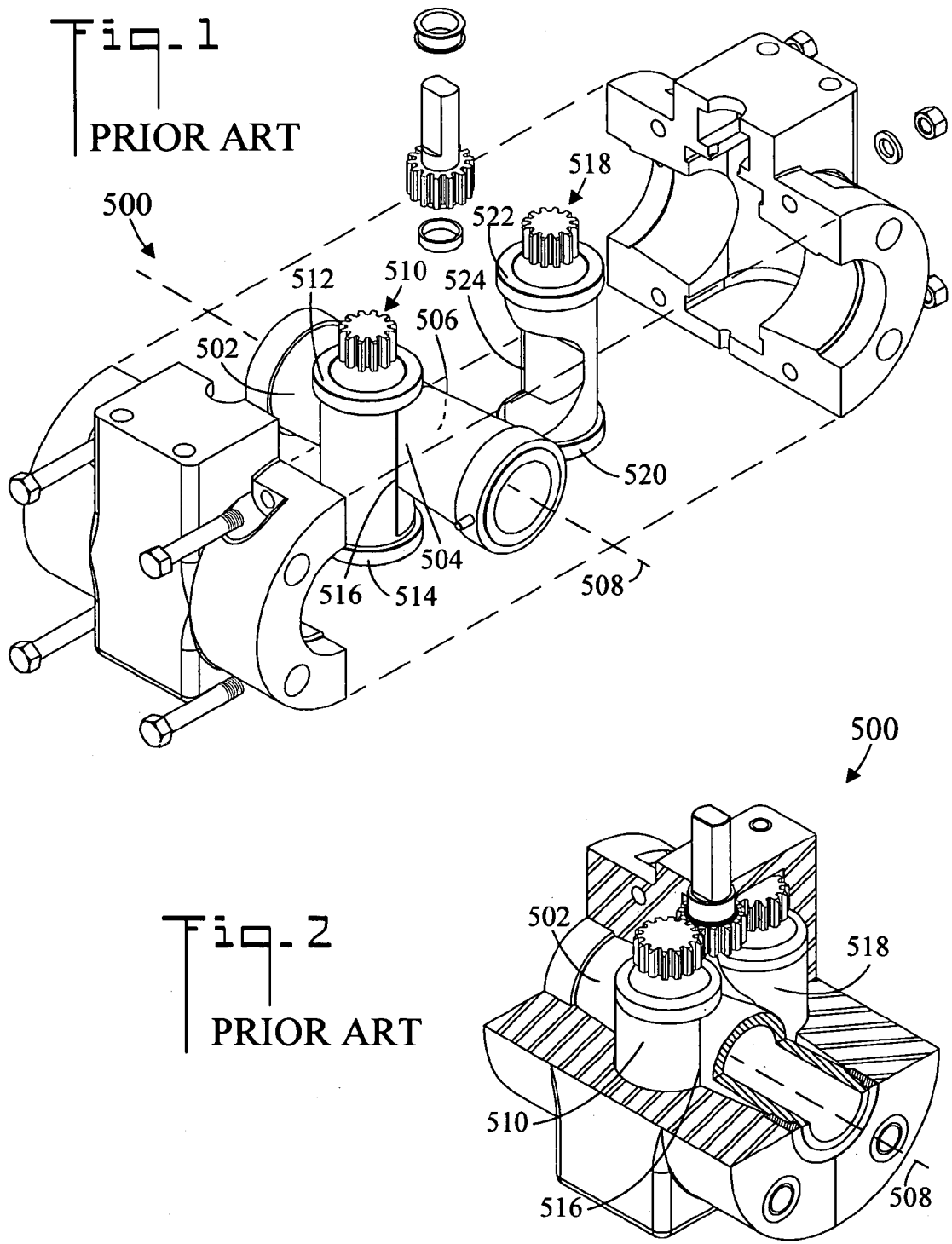

Fig_3
PRIOR ART
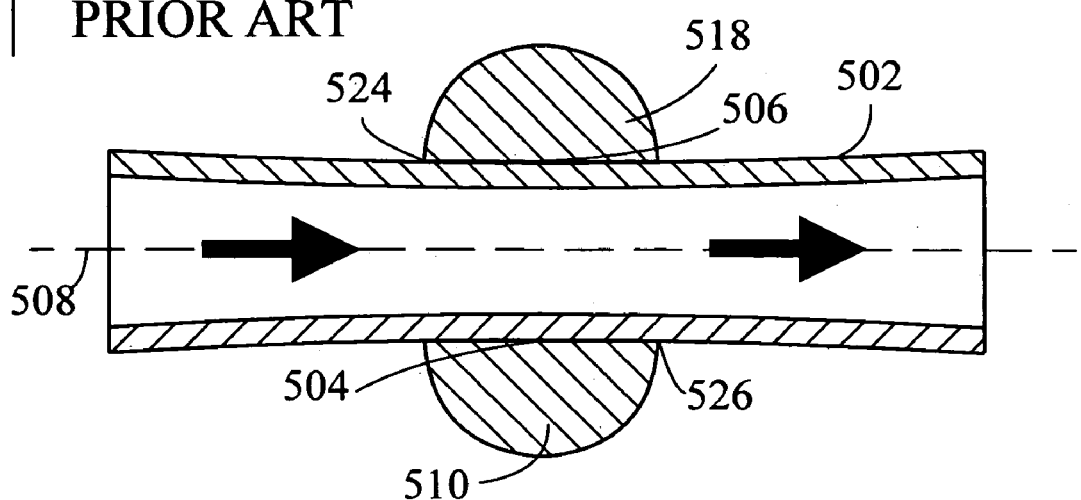
Fig_4
PRIOR ART
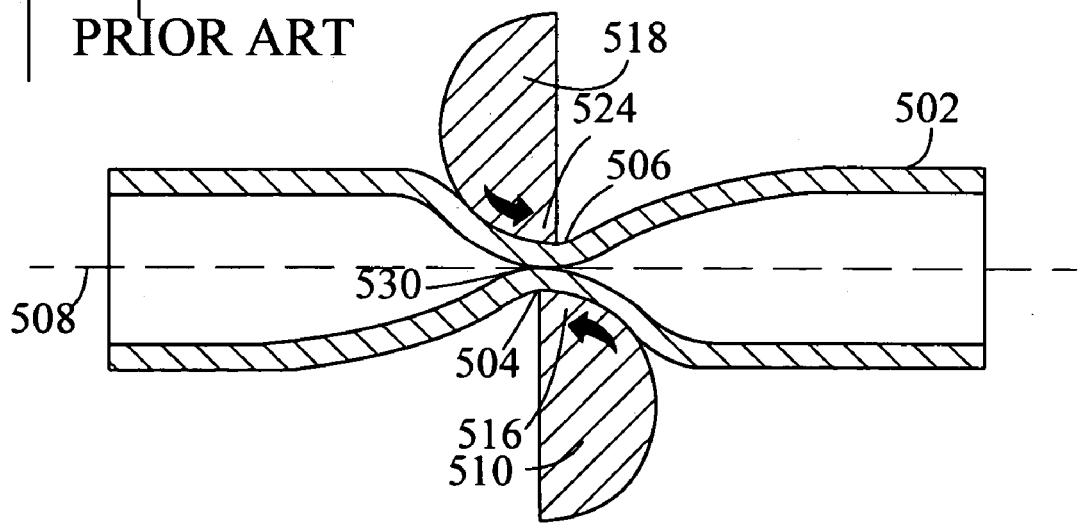

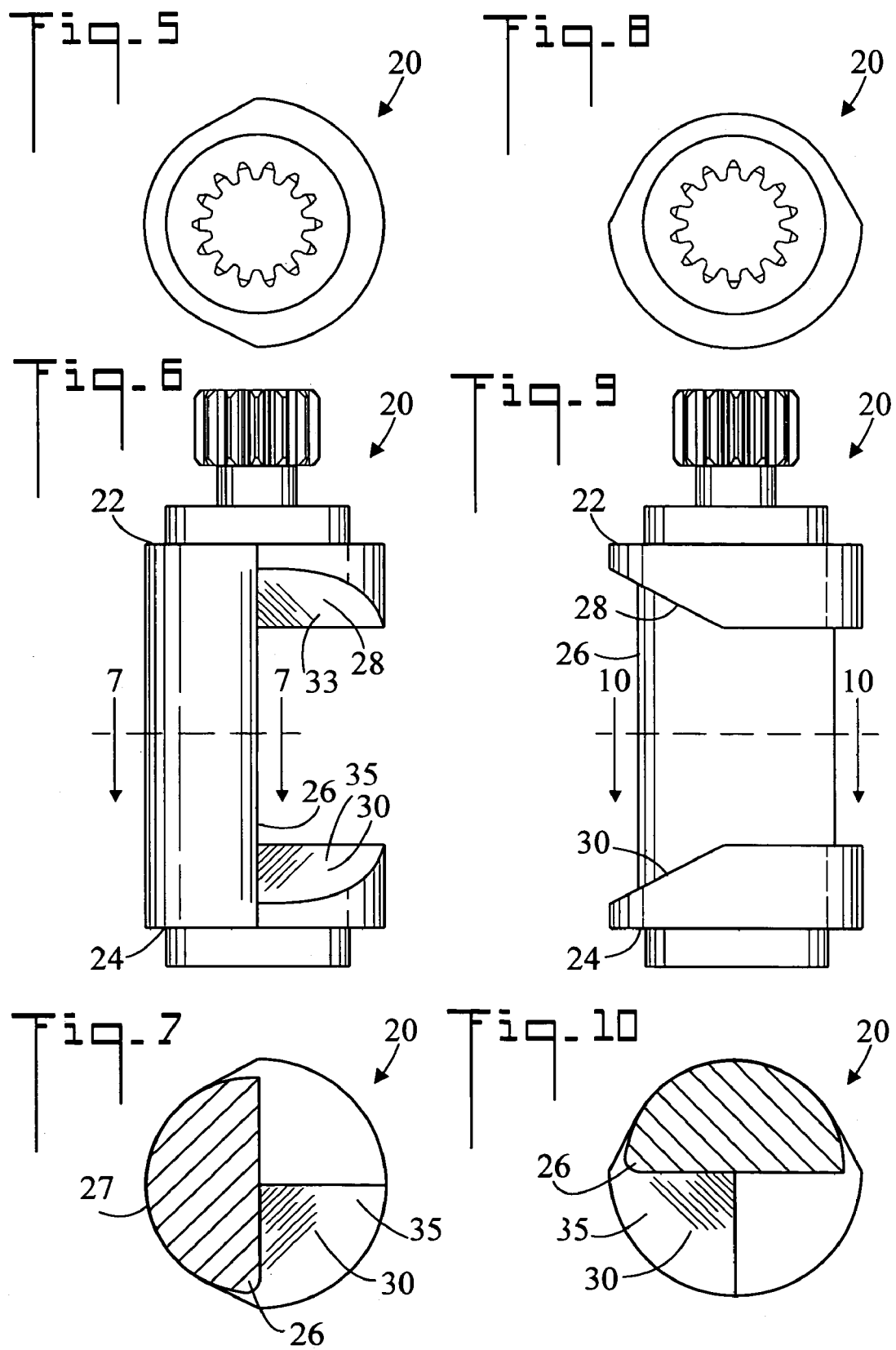

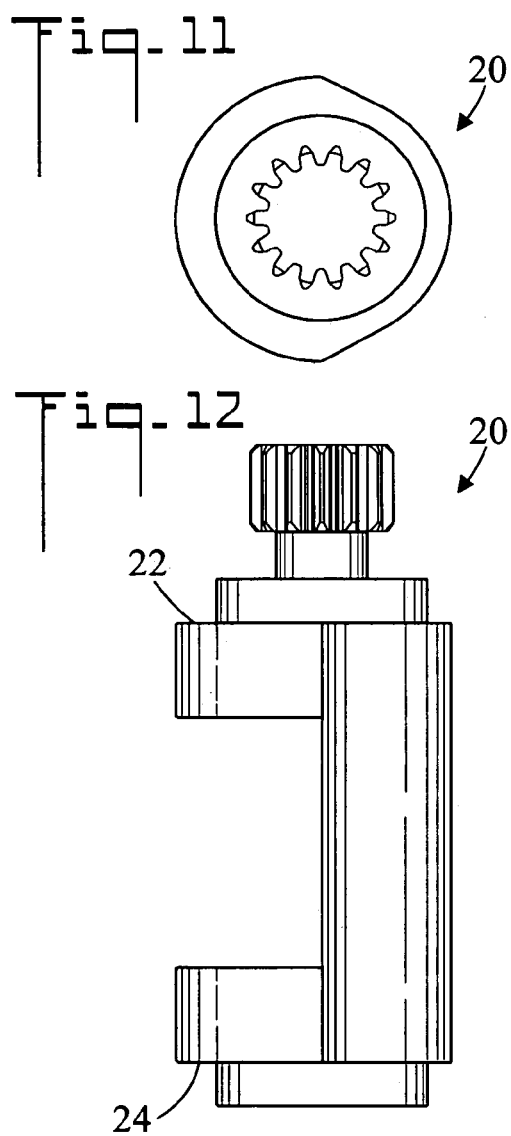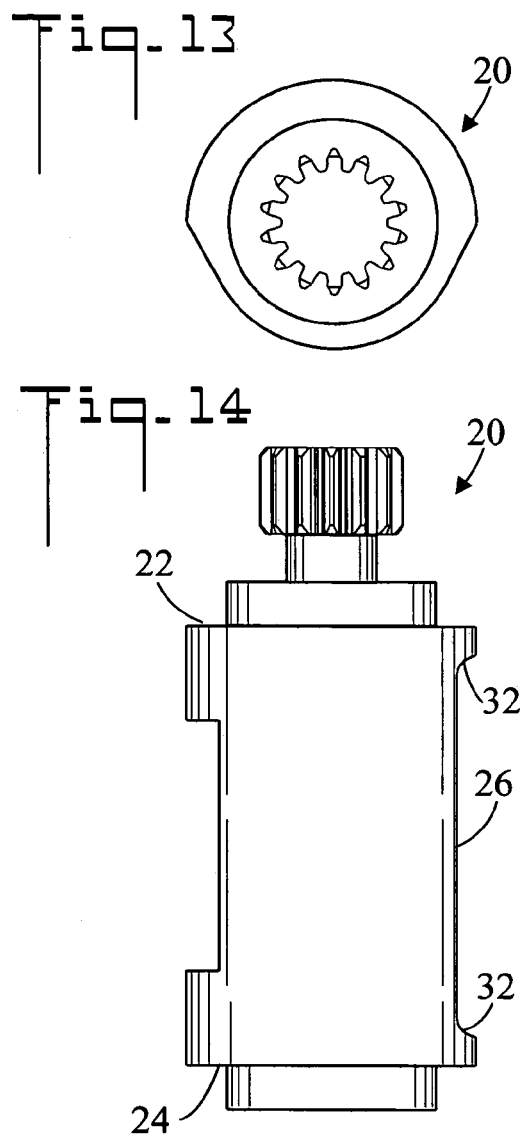

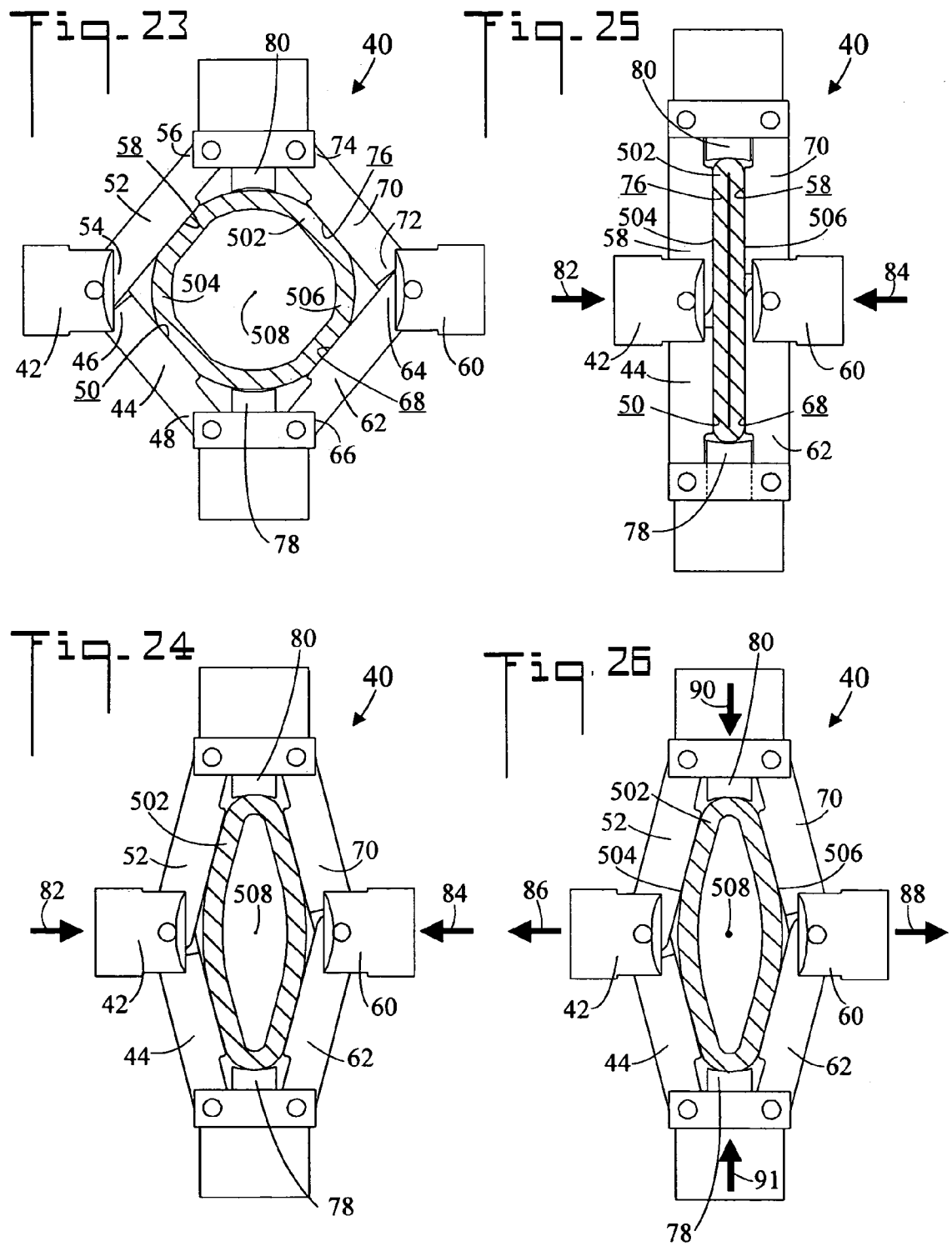

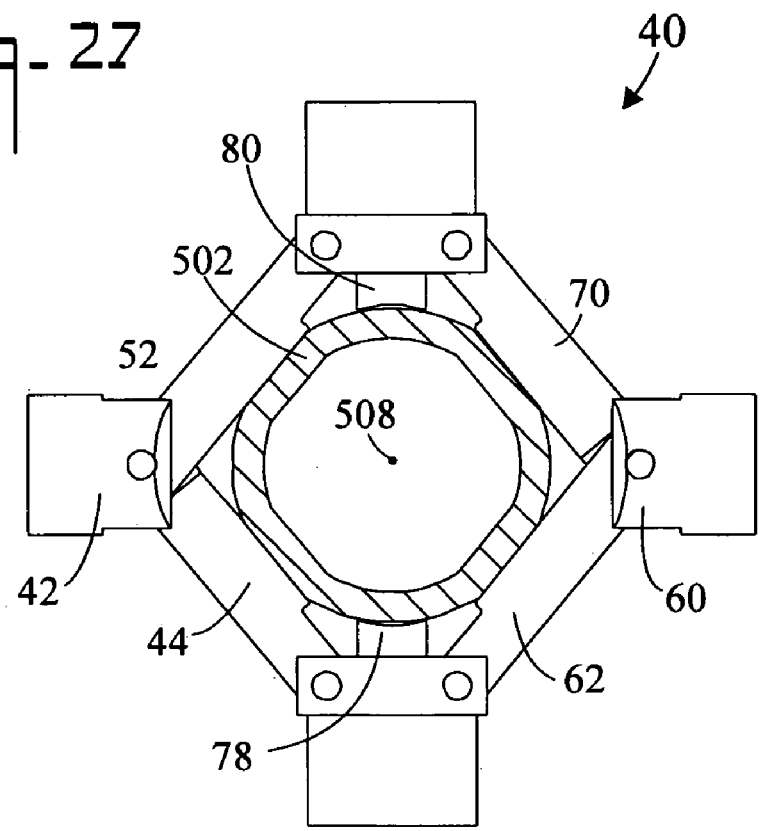
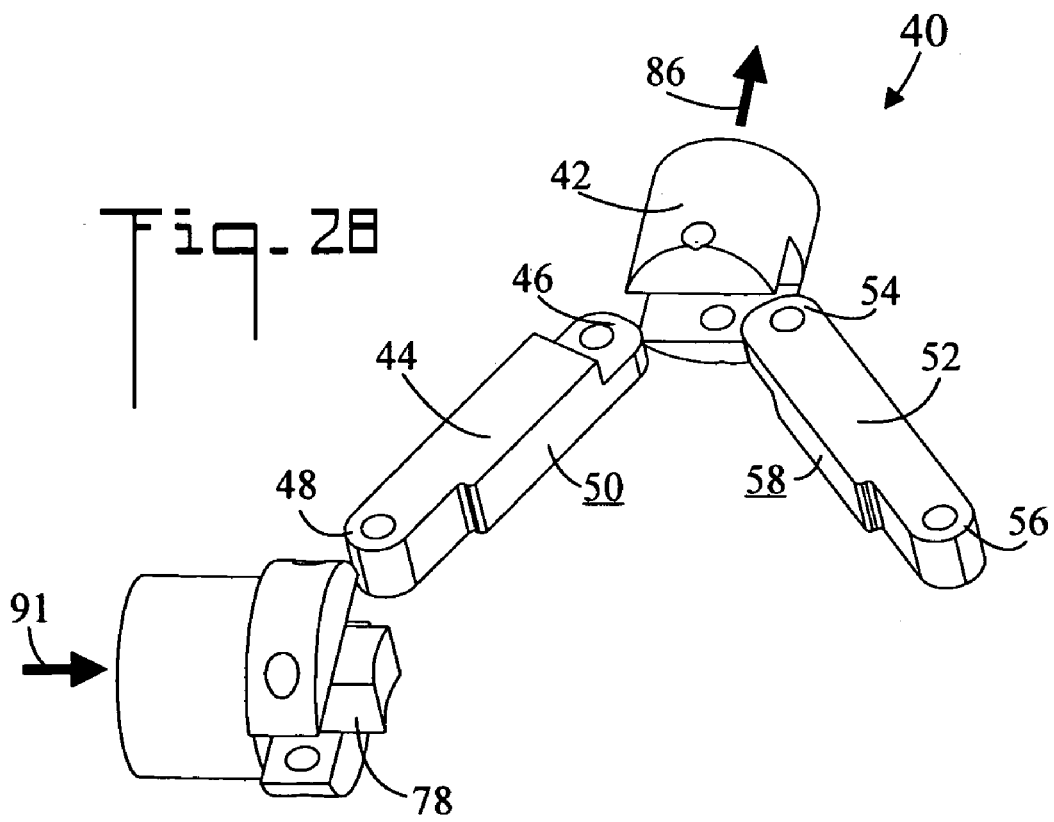

PINCH VALVE FOR REGULATING FLUID FLOW

TECHNICAL FIELD

The present invention pertains generally to fluid flow, and more particularly to flow control devices with sleeves, such as pinch valves, for regulating, measuring, throttling or stopping the flow of a fluid.

BACKGROUND OF THE INVENTION

Pinch-type valves with flexible tubular spool-sleeves are commonly used in the chemical process industry, food industry, mining, metallurgy, plating and indeed in any industry where liquids containing solids, such as slurries, and other hard-to-handle fluids and even solids are made to flow. Pinch valve devices that include spool-sleeves are used for both on/off and flow control situations. The general distinctions and advantages of pinch valves over other types of valves are well known and recognized in the art.

The basic construction of a pinch valve consists of a flexible resilient flanged spool-sleeve installed in a fluid process line together with means to constrict the tube so as to regulate, throttle or terminate the flow of the fluid through the line. Some pinch valves employ a mechanical pinch mechanism to constrict the spool-sleeve. One type of pinch valve manufactured today consists of a flanged spool-sleeve in which the spool-sleeve is fitted either into a one-piece housing (by distorting the flange and pushing the spool-sleeve into the housing) or more commonly, in a split housing with its associated sealing gaskets and bolts. The spool-sleeve flange is outside the housing and is sandwiched between flanges on the housing and the line piping and serves to seal the valve against leakage of process fluids. Where adjustment of the valve is by a motive fluid, for example air or hydraulic fluid, which squeezes the intermediate portion of the sleeve, the flange also serves to seal the motive fluid.

U.S. Pat. No. 4,682,755 illustrates a pinch valve that includes a housing with a quarter-turn closure mechanism disposed within the housing for adjustment of a spool-sleeve. The mechanism consists of two cam members rotatably supported in the housing on the opposite sides of the sleeve and connected to a hub via drive links. The hub is disposed proximate an opening in the housing and is rotated manually by a handle, or automatically by an actuator. Each cam member includes a first portion that is rotatable across the sleeve and a shank portion that is eccentrically disposed on the first portion and traverses the spool-sleeve profile. As the cam members are rotated the shank portions move transversely of the sleeve longitudinal axis, toward and away from one another for pinching the spool-sleeve and thereby selectively throttling or stopping the flow through the system. When rotated to a fully retracted or release position, the shank portions are completely withdrawn from the outside profile projection of the spool-sleeve, whereby the spool-sleeve can be removed axially from the housing. The pinch valve also may have motive fluid means for pinching the spool-sleeve. The device comprises a one-piece body design incorporating two closure cams operating in an arcuate path to close the sleeve, and a relatively complex drive linkage. Component and assembly costs made manufacture of this design uneconomical. To simplify the design, the drive linkage was replaced with a slotted cam plate assembly, in which the top of each cam was fitted with a pin and bearing that rode in a cam plate slot. Although more economical, this design yielded high torque values and mechanical problems associated with bearing point loading.

A major improvement then followed, wherein a vertically split body with gears affixed to the top of the cams, are driven by a center gear and stem assembly for rotating the cams, (i.e., a three-gear drive system). In addition, the cams were turned (or advanced) so as to decrease torque by decreasing cam angular travel. This system was suitable more for flow control applications, rather than for on-off situations. Since a majority of applications for this valve were found to be for on-off applications, the design was again modified to the present configuration, in which the cams are at a full open position, with the resultant increase in torque value. When viewing the valve waterway, a full circle is seen. This configuration is deemed best for liquid-solid particle slurries in on-off applications, although the valve is still able to be a reasonable flow control valve.

However, there exists a major problem with pinch-type of valves of the type described above. When the valves are closed for an extended time period, the sleeve will tend to set in the closed position. The sleeve can stick in the closed position, for example if the process material holds it together, or it may open slowly or only partially. In many situations, process pressure is high enough to overcome this set condition, at least in part, so as to sufficiently open the sleeve. However, when process pressure is low, as in gravity discharge from a tank, the sleeve may remain in a partially closed position. This situation is even more evident when the sleeve is lined with a plastic such as PTFE. The increased rigidity of the plastic-lined sleeve causes very slow recovery to the open position, even when this type of sleeve remains closed for only a short time.

BRIEF SUMMARY OF THE DESCRIPTION

This summary is not intended to mention or to be a complete statement of every embodiment or aspect of the invention or to constitute a recitation of the content of every claim.

The present invention is directed to improved pinch valves that urge or force the sleeve open thereby overcoming the aforementioned "set" problem. As used herein the term "sleeve" broadly means any configuration in which a flexible resilient tube forms a part through which process fluid flows. In one embodiment a mechanically actuated pinch valve includes an sleeve which is operated upon by a two-cam mechanism moving in an arcuate path, such that the same cam assembly that forces the sleeve closed also pushes the sleeve open. The sleeve is a flexible resilient material and can be elastomeric, plastic-lined elastomeric, or plastic. For some applications the interior surface material of the sleeve may be required to meet stringent specifications, such as in the food and pharmaceutical industries. In such cases the sleeve is lined with a material that will be acceptable. Such materials will often cause the sleeve to be less resilient and stiffer. The cam members are designed so that rotation in one direction closes, or pinches the sleeve, and rotation in the other direction forces the sleeve open by pushing on the sleeve in the vertical plane, from the top and the bottom in the central or closure area of the sleeve. One set of cams called close cams push on the sleeve from opposite sides to pinch it closed. Another set of cams called open cams (also referred to as push ridges or ramps or cam ramps) are added to the top and bottom of the cam assembly, and angled or curved such that upon rotation of the cam assembly from a closed or partially closed position they will contact the sleeve and push vertically as the close cams move away from the close position to force the sleeve to return to the open position. The sleeve must have at least a minimal space between the open cams in the closed position, so that the sleeve is not prevented from closing; although with sufficient precision it may be desirable to have the open cams be in contact with the sleeve in the closed position. Also, in some configurations it may be desirable to have the open cam in contact with the sleeve in the open position to slightly deform it from the circular shape, as will be explained in more detail below.

When rotating the cam assembly from the closed position in which the sleeve is fully or partially pinched to the open position, the sleeve is pushed open by the decreasing distance between the upper and lower open cams (due to the slope or curvature of the ridges), in the vertical center area of the sleeve. The sleeve is normally molded in the open position. Since the cam members can now force the sleeve to open, the sleeve can also be molded in the closed or partially closed position. Since operating torque is proportional to process pressure exerted on the cam members, molding the sleeve in the closed or partially closed position effectively lowers the torque required to close the valve. This lower operating torque will allow ease of use of manually operated valves and decrease the cost and size of valve actuators for automated valves. In one embodiment there is a cam-type mechanical closure system in which the geometry of the cam allows for urging a closed sleeve to the open position when the cams move from the closed position to the open position. This design eliminates reliance on (1) the elastomeric properties of the sleeve, that is, its resilience, and (2) process pressure, to effect the opening of the sleeve.

In another embodiment of the present invention, a four bar linkage arrangement is employed wherein pushing from one direction closes the sleeve in the centerline due to the linkage constraints in the perpendicular direction, and pulling from the opposite direction forces the sleeve open. This arrangement fitted in a proper valve body, can be actuated manually in a single turn mode, or actuated with compressed air or hydraulic fluid to automate this valve. As is evident, the same mechanism which closes the valve also pushes the spool open as in the previous embodiment.

For either of the above-described embodiments, the sleeve, normally molded in the open position, can be manufactured in the almost closed position as well, thereby significantly decreasing torque required to close the valve.

In accordance with a preferred embodiment of the invention, a prior art pinch valve has (1) an sleeve having a first side portion, an opposite second side portion, and a central longitudinal axis, (2) a first cam assembly including a first end and an opposite second end, a first close cam disposed between the first and second ends of the first cam assembly, the first close cam disposed adjacent to the first side portion of the sleeve, (3) a second cam assembly including a first end and an opposite second end, a second close cam disposed between the first and second ends of the second cam assembly, the second close cam disposed adjacent to the second side portion of the sleeve, wherein the first and second cam assemblies are rotatable between the open and closed positions wherein the first and second close cams pinch the first and second side portions respectively together forming a closure in the sleeve, the closure having first and second ends, and wherein the first and second cam assemblies are rotatable to an open position wherein the sleeve resides in an open state. The improvement comprises the first cam assembly including a first open cam disposed at the first end of the first cam assembly. When the first and second cam assemblies rotate from the closed position to the open position the first open cam contacts the first end of the closure and urges the sleeve toward the central longitudinal axis. This urging at the ends of the closure forces the sides of the tube apart to break a "set" condition.

In an aspect of the invention, a second open cam is disposed at the second end of the first cam assembly. When the first and second cam assemblies rotate from the closed position to the open position the second open cam contacts the second end of the closure and urges the sleeve toward the central longitudinal axis, thus, the first and second close cams operate together to urge the sleeve to the open position from both the top and bottom of the closure.

In another aspect of the invention, the second cam assembly has a third open cam disposed at the first end of the second cam assembly, and a fourth open cam disposed at the second end of the second cam assembly. When the first and second cam assemblies rotate from the closed position to the open position the third open cam contacts the first end of the closure and urges the sleeve toward the central longitudinal axis, and the fourth open cam contacts the second end of the closure and urges the sleeve toward the central longitudinal axis.

In another aspect of the invention, the open cams include a ramp, which pushes against the first end of the closure as the cam assembly rotates from the closed position to the open position.

In another aspect of the invention, the sleeve has in inner diameter D; and each of the open cams has a throw of about ¼ D, that is, the distance traversed as the open cams are rotated and bear against the closure is up to about ½ D In another aspect of the invention, when in the open position the open cams contact the ends of the closure, and remaining in contact with the sleeve as the cam assembles are rotated from the open position to the closed position.

In another aspect of the invention, each open cam is contoured to receive half of the first end of the closure in the sleeve.

In another embodiment of the invention, the sleeve is surrounded by a four bar linkage. Opposite sides of the linkage may be moved together to effect closure of the tube, and apart to open the tube. During opening the ends of the tube closure are push together to break any "set" in the tube.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is an exploded perspective view of a prior art pinch valve;

FIG. 2 is a cutaway perspective view of the prior art pinch valve;

FIG. 3 is an enlarged cross sectional view showing the prior art pinch valve in an open state;

FIG. 4 is an enlarged cross sectional view showing the prior art pinch valve in a closed state;

FIG. 5 a top plan view of a cam assembly in accordance with the present invention;

FIG. 6 is a front elevation view of the cam assembly;

FIG. 7 is a cross sectional view along the line 7-7 of FIG. 6;

FIG. 8 a top plan view of a cam assembly rotated left 90° from FIG. 5;

FIG. 9 is a side elevation view of the cam assembly;

FIG. 10 is a cross sectional view along the line 10-10 of FIG. 9;

FIG. 11 a top plan view of a cam assembly rotated left 90° from FIG. 8;

FIG. 12 is a rear elevation view of the cam assembly;

FIG. 13 is a top plan view of the cam assembly rotated left 90° from FIG. 11;

FIG. 14 is an opposite side elevation view of the cam assembly;

FIG. 23 is a reduced top plan view of a second embodiment of the present invention, showing the sleeve in a fully open state;

FIG. 24 is a reduced top plan view of the second embodiment showing the sleeve in a partially closed state;

FIG. 25 is a reduced top plan view of the second embodiment showing the sleeve in a fully closed state;

FIG. 26 is a reduced top plan view of a second embodiment of the present invention, showing the sleeve in a partially open state;

FIG. 27 is a reduced top plan view of the second embodiment showing the sleeve in a fully open state;

FIG. 28 is an enlarged partial perspective view of the second embodiment;

DETAILED DESCRIPTION OF THE INVENTION

Figure 15:
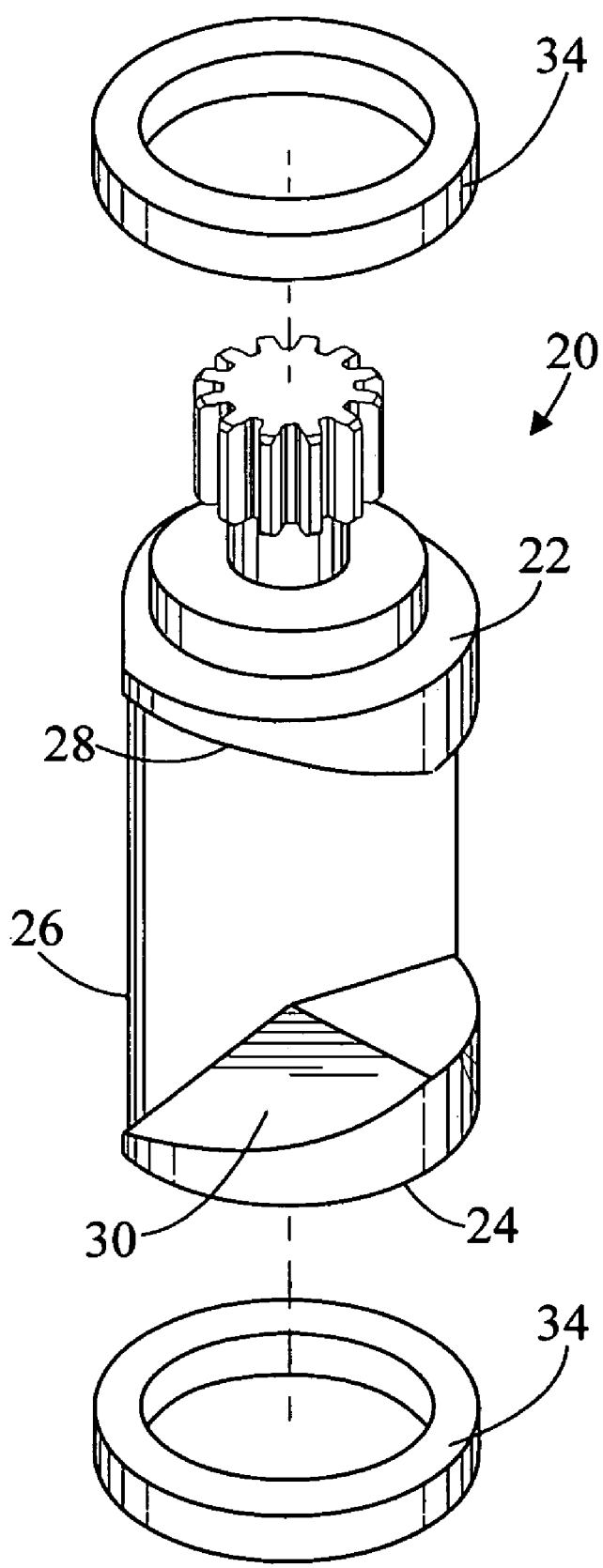
FIG. 15 is a perspective view of the cam assembly.

When terms are used in this description to define the positional relationship of parts such as left, right, upper and lower these terms relate to the relative orientations shown in the figures.

Referring initially to FIGS. 1 and 2, there are illustrated exploded perspective and cutaway perspective views respectively of a prior art pinch valve, generally designated 500 and having a housing 400 that can be constructed of several parts such as 402a and 402b, assembled together. Pinch valve 500 includes a sleeve 502 having a first side portion 504, an opposite second side portion 506, and a central longitudinal axis 508. Sleeve 502 can be a rubber tube, an elastomeric tube (a rubber-like synthetic polymer), a polymer tube, a polymer lined sleeve, or any other tube materials that makes it flexible and resilient, that are compatible with pinch valve application. As used herein the term "sleeve" is not limited to the particular configuration or configurations known but rather means any flexible resilient member that can be employed in a pinch valve.

Pinch valve 500 also includes a first cam assembly 510 having a first (upper) end 512 and an opposite second (lower) end 514. A first close cam 516 is disposed between first end 512 and second end 514 of first cam assembly 510, first close cam 516 is disposed adjacent to first side portion 504 of sleeve 502.

A second cam assembly 518 includes a first (upper) end 522 and an opposite second (lower) end 520, a second close cam 524 is disposed between first end 522 and second end 520 of second cam assembly 518, second close cam 524 disposed adjacent to second side portion 506 of sleeve 502.

FIG. 3 is an enlarged cross sectional view showing sleeve 502 of prior art pinch valve 500 in an open state, and FIG. 4 is an enlarged cross sectional view showing sleeve 502 of prior art pinch valve 500 in a closed state. First cam assembly 510 and second cam assembly 518 are rotatable to an open position (FIG. 3) wherein sleeve 502 resides in a fully open state and fluid may freely flow. First cam assembly 510 and second cam assembly 518 are rotatable to a closed position (FIG. 4) wherein first close cam 516 and second close cam 524 pinch first side portion 504 and second side portion 506 respectively together forming a closure 530 (also refer to FIG. 16) in sleeve 502, closure 530 having first (upper) end 532 and second (lower) end 534 (also refer to FIG. 16). When first cam assembly 510 and second cam assembly 518 are rotated to the closed position, sleeve 502 resides in a fully closed state wherein fluid flow is blocked by the closure 530.

Now referring to FIGS. 5-7, there are illustrated top plan, front elevation, and cross sectional views respectively of a first cam assembly in accordance with the present invention, generally designated as 20. Cam assembly 20 includes a close cam for closing sleeve 502 by pinching first side portion 504 and second side portion 506 together (refer to FIG. 4). First cam assembly 20 includes a first (upper) end 22 and an opposite second (lower) end 24. A close mechanism includes first close cam 26 having a cam surface 27 is disposed between first (upper) end 22 and second (lower) end 24 of first cam assembly 20, wherein first close cam 26 is disposed adjacent to first side portion 504 of sleeve 502 (refer also to FIG. 16). It is noted that cam surface 27 of the first close cam 26 is smoothly curved to prevent damage to sleeve 502.

An open mechanism includes first (upper) open cam 28 and second (lower) open cam 30 disposed at first end 22 and second end 24 respectively of first cam assembly 20. The first (upper) open cam 28 and second (lower) open cam 30 each have a cam surface 33 and 35 respectively which pushes against first (upper) end 532 and second (lower) end 534 respectively of closure 530 as first cam assembly 20 rotates from a closed position to a open position (also refer to FIG. 16).

Figure 16:
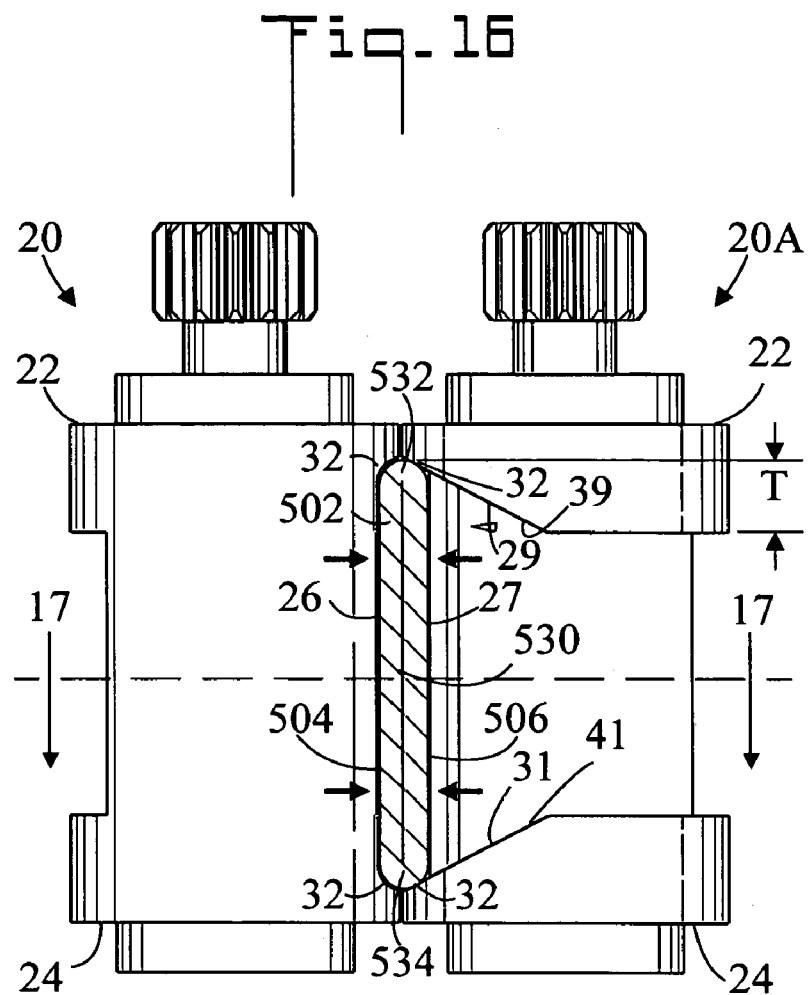
FIG. 16 is an elevation view showing a sleeve closed by two cam assemblies.
Figure 18:
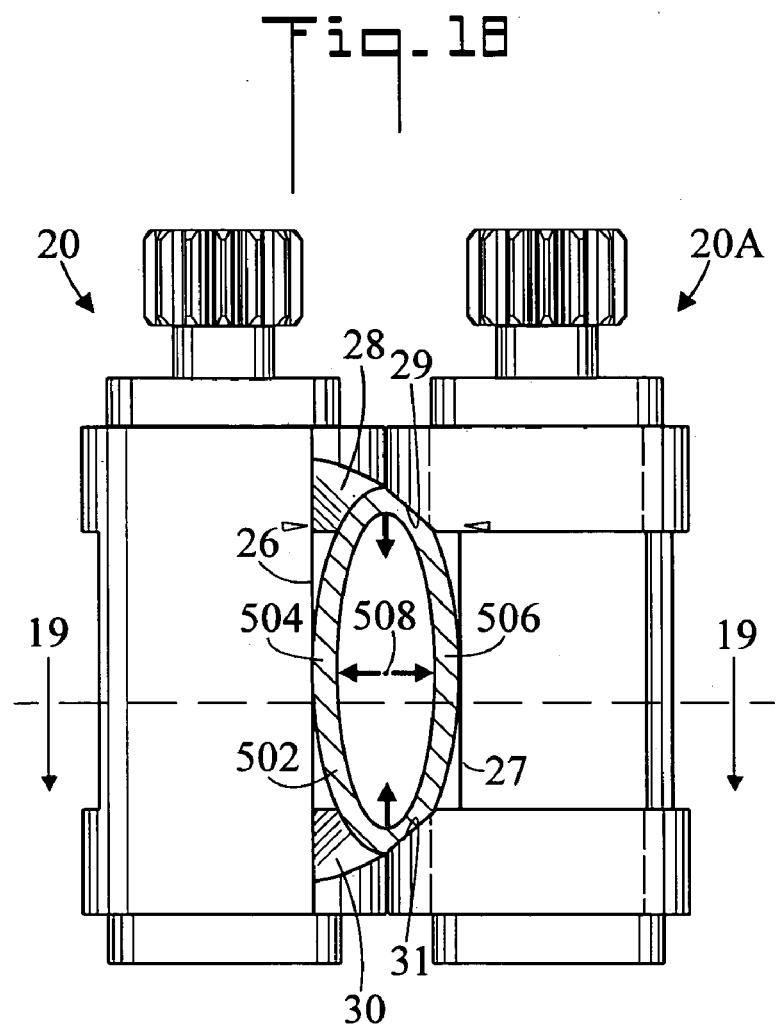
FIG. 18 is an elevation view showing the sleeve in a partially open state.

As is shown in FIGS. 16 and 18, the close and open mechanisms of first (left) cam assembly 20 and second (right) cam assembly 20A cooperate to close sleeve 502 to form the closure 530.

Second (right) cam assembly 20A includes a first (right-upper) end 22 and an opposite second (right-lower) end 24. A second close cam 27 is disposed between first (right-upper) end 22 and second (right-lower) end 24 of second (right) cam assembly 20A, wherein second close cam 27 is disposed adjacent to second (right) side portion 506 of sleeve 502. Similarly the open mechanism includes third (right-upper) open cam 29 and fourth (right-lower) open cam 31 disposed at first (right-upper) end 22 and second (right-lower) end 24 respectively of second cam assembly 20A. The third (right-upper) open cam 29 and fourth (right-lower) open cam 31 each have a cam surface 39 (hidden) and 41 respectively which pushes against first (upper) end 532 and second (lower) end 534 respectively of closure 530 as second cam assembly 20A rotates from a closed position to a open position.

Now referring to FIGS. 8-10, there are illustrated top plan, front elevation, and cross sectional views respectively of first cam assembly 20 rotated left 90° from FIG. 5.

FIGS. 11-12 are top plan and rear elevation views respectively of first cam assembly 20 rotated left 90° from FIG. 8.

FIGS. 13-14 are top plan and opposite side elevation views respectively of first cam assembly 20 rotated left 90° from FIG. 11. First (upper-left) open cam 28 and second (lower-left) open cam 30 and third (upper-right) open cam 29 and fourth (lower-right) open cam 31 are contoured at 32 to contact half of first end 532 of closure 530 in sleeve 502 (also refer to FIG. 16). The first end 532 can be characterized as a fold in the sleeve, in particular an upper fold and the second end 534 can be characterized as a lower fold in the sleeve 530. Consequently, the operation is that the upper left open cam 28 contacts the left side of the upper fold 532 and the lower left open cam 30 contacts the left side of the lower fold 534. Similarly the upper right open cam 29 contacts the upper right side of the fold 532 and the lower right open cam contacts the lower right side of fold 534. In one embodiment upper and lower open cams are formed in only one cam assembly, either the left or right. In another embodiment there are upper and lower open cams on both cam assemblies.

FIG. 15 is a perspective view of first cam assembly 20. Two collars 34 are removable attached to the ends of first cam assembly 20. Collars 34 register cam assembly 20 within the pinch valve housing.

Figure 17:
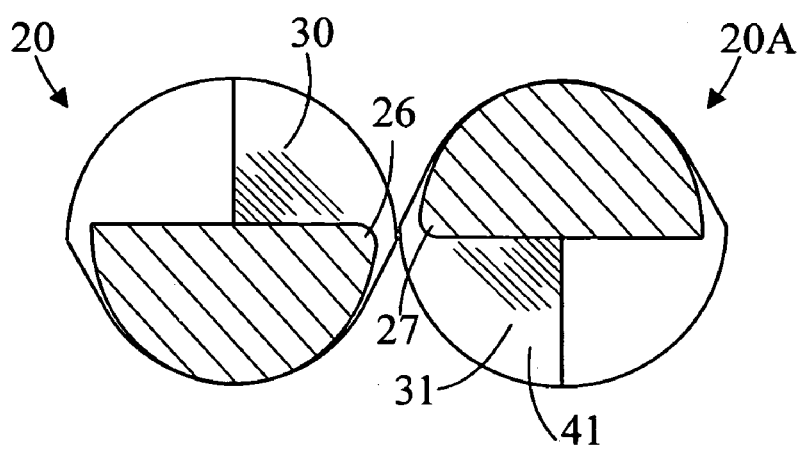
FIG. 17 is a cross sectional view of the cam assemblies along line 17-17 of FIG. 16.

FIG. 16 is an elevation view showing sleeve 502 closed into the closure 530 by first cam assembly 20 and second cam assembly 20A, and FIG. 17 is a cross sectional view of the cam assemblies along line 17-17 of FIG. 16. First cam assembly 20 and second cam assembly 20A are rotated to a closed position wherein first close cam 26 and second close cam 27 pinch first side portion 504 and second side portion 506 together forming a closure 530 in sleeve 502, closure 530 having first end (upper fold) 532 and second end (lower fold) 534. It is known that when pinched to form the closure 530 the ends 532 and 534 will form a "cats eye", that is a space inside the fold (the cats eye space is not shown in FIGS. 16 and 25). Closure 530 is shown in cross section in FIG. 16. In this position the contours at 32 of the four open cams (28, 30, 29, and 31) each receive one half of one end of closure 530 that is they each receive or contact one side of the respective folds. It is further noted that the first cam assembly 20 and second cam assembly 20A are disposed in opposite orientation yet rotate in the same direction as shown by the arrows A in FIG. 17 (also refer to FIGS. 18 and 19).

Figure 19:
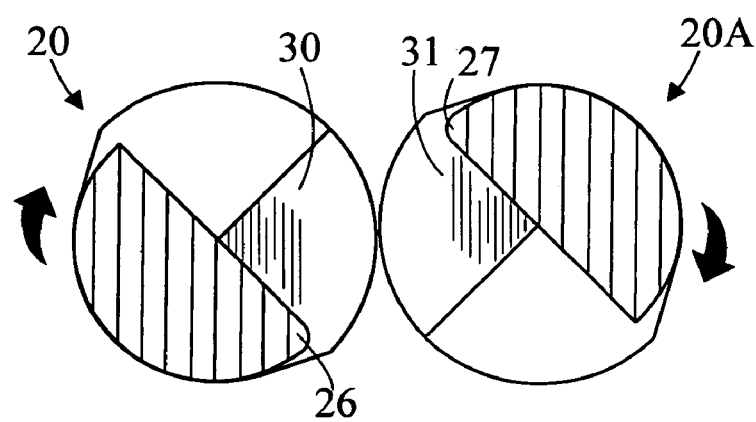
FIG. 19 is a cross sectional view of the cam assemblies along line 19-19 of FIG. 18.

FIG. 18 is an elevation view showing sleeve 502 in a partially open state, and FIG. 19 is a cross sectional view of the cam assemblies along line 19-19 of FIG. 18. In these views, the cam assemblies have been rotated clockwise about 45°. As first cam assembly 20 and second cam assembly 20A rotate from the closed position of FIGS. 16 and 17 to the open position of FIGS. 20 and 21, first (upper left) open cam 28 and third (upper right) open cam 29 contact first (upper fold) end 532 of closure 530 and urge sleeve 502 toward central longitudinal axis 508. Similarly second (lower left) open cam 30 and third (lower right) open cam 31 contact second (lower fold) end 534 of closure 530 and urge sleeve 502 toward central longitudinal axis 508. By pushing against the closure ends or folds 532 and 534 of sleeve 502, the open cams effectively force apart the first (left) side portion 504 and second (right) side portion 506 of sleeve 502 should they initially be "set". Arrows in FIG. 18 inside the sleeve 502 show the movement of the sleeve 502 from its configuration in closure 530 toward the open configuration.

Figure 20:
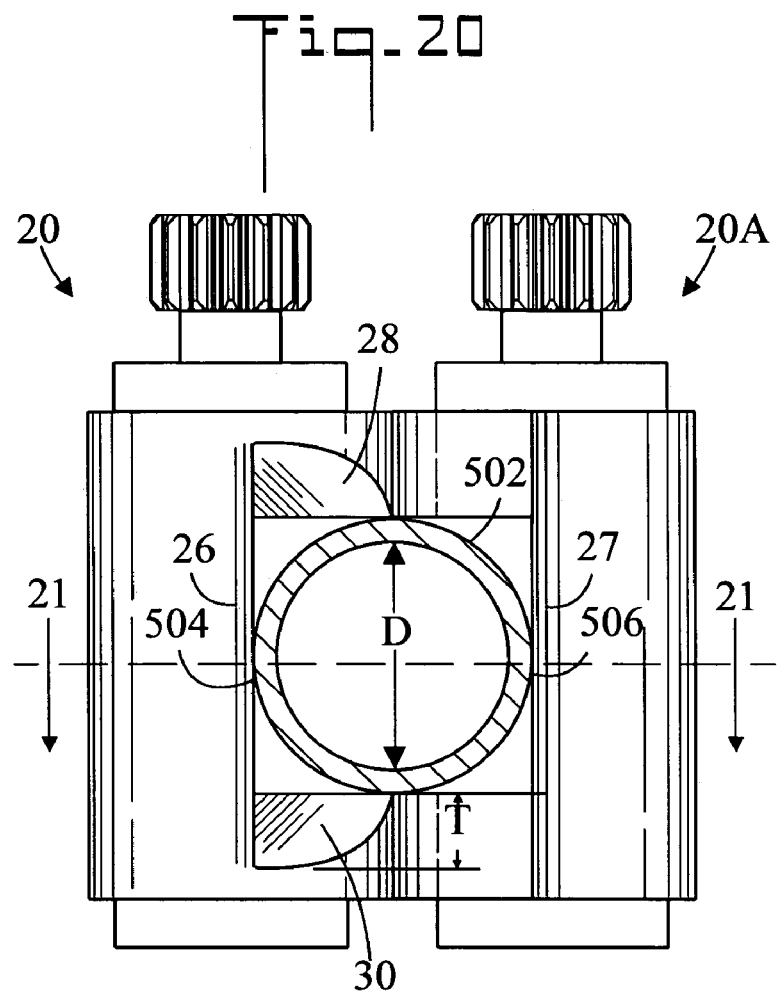
FIG. 20 is an elevation view showing the sleeve in a fully open state.
Figure 21:
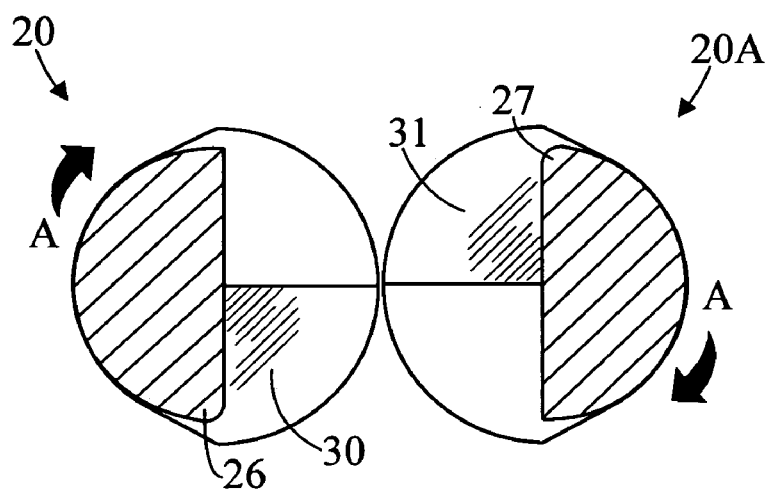
FIG. 21 is a cross sectional view along the line 21-21 of FIG. 20.

FIG. 20 is an elevation view showing sleeve 502 in a fully open state, and FIG. 21 is a cross sectional view along the line 21-21 of FIG. 20. First (left) cam assembly 20 and second (right) cam assembly 20A have been rotated to a fully open position wherein sleeve 502 resides in an open state (also refer to FIG. 3). When first (left) cam assembly 20 and second (right) cam assembly 20A are in the shown open position first (upper left) open cam 28 and third (upper right) open cam 29, and second (lower left) open cam 30 and fourth (lower right) open cam 31 preferably slightly contact the first end 532 and second end 534 of closure 530 respectively (now converted to an open configuration), and the first open cam 28, second open cam 30, third open cam 29, and fourth open cam 31 remaining in contact with sleeve 502 as first cam assembly 20 and second cam assembly 20A are rotated from the open position to the closed position.

In another embodiment of the invention, sleeve 502 has an inner diameter D. First open cam 28, second open cam 30, third open cam 29, and fourth open cam 31 each traverse a distance (this can be called the "cam throw") while in contact with the sleeve of about ¼ D as shown at "T" in FIGS. 16 and 20.

Figure 22:
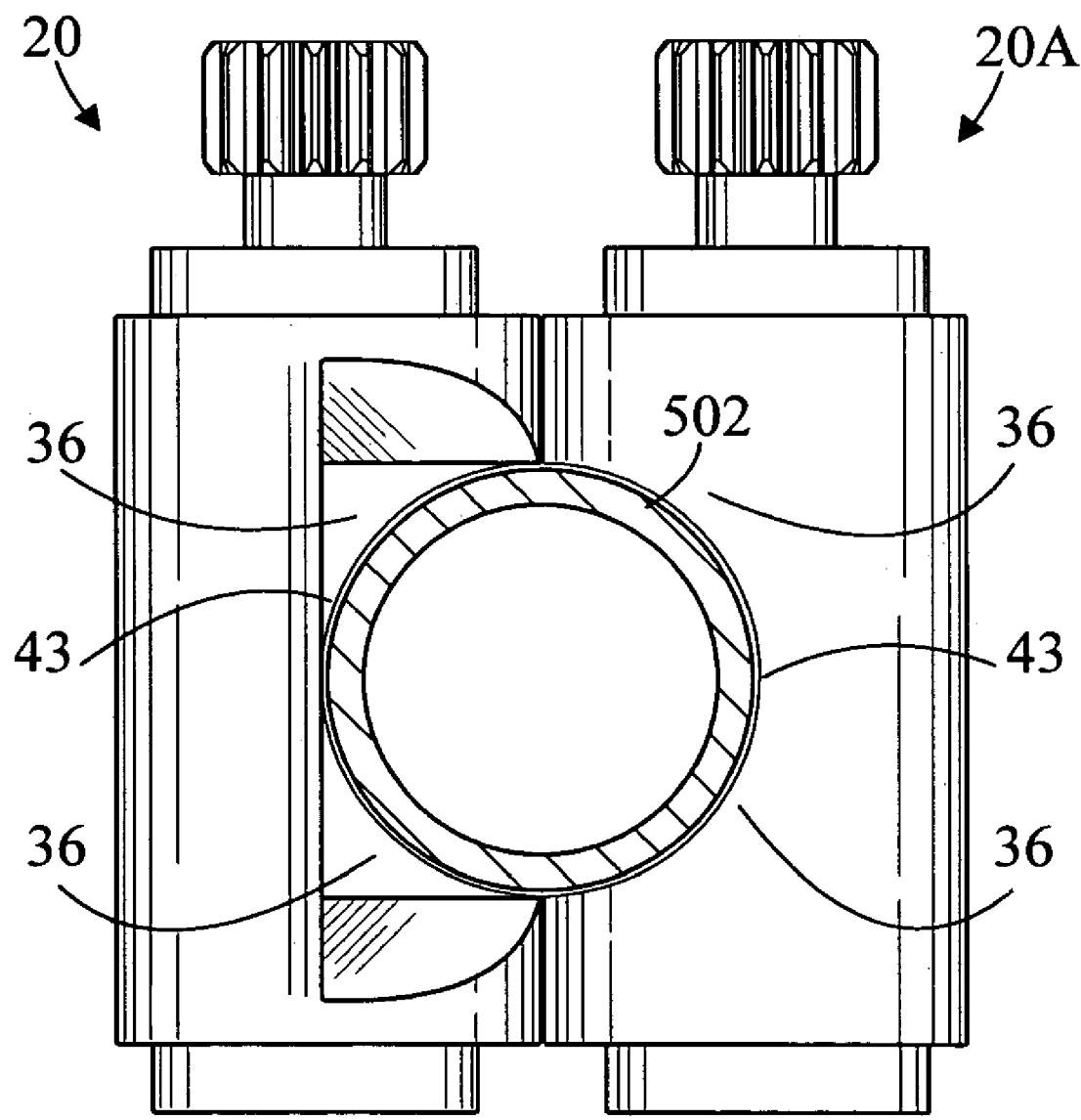
FIG. 22 is an elevation view showing the sleeve in a fully open state, and showing a second embodiment of the cam assemblies.

FIG. 22 is an elevation view showing sleeve 502 in a fully open state, and showing a second embodiment of cam assemblies 20 and 20A. In this embodiment additional material 36 has been added to the cam assemblies to support sleeve 502 when it is in the open state. The additional material 36 is contoured in a semicircle configured to provide a surface 43 to receive the rounded sleeve 502.

Figure 29:
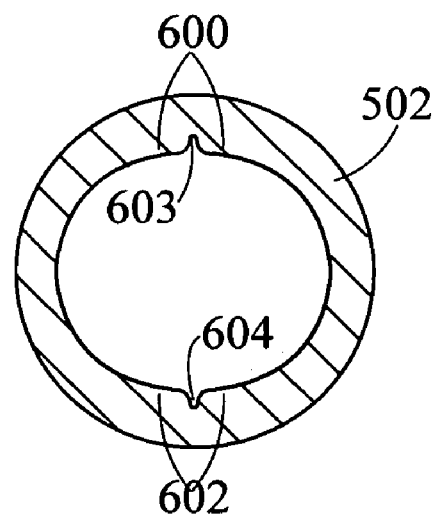
FIG. 29 is a central cross sectional view of a second prior art embodiment of the sleeve; and, FIG. 30 is an elevation view of an embodiment of the present invention, which mitigates against the filling of slots.

Now referring to FIG. 29, there is illustrated a central cross sectional view of a second prior art embodiment of sleeve 502. In this embodiment the inside of sleeve 502 has two pairs of pads 600 and 602. Pads 600 and 602 are constructed to form slots 603 and 604 respectively. This pad and slot arrangement is well known in the art and prevents the small cats eye openings, from forming at the closure ends, the folds, of sleeve 502 when the it is in the closed state (refer to FIG. 16). A problem exists however in that process material can become lodged in the slots 603 and 604.

Figure 30:
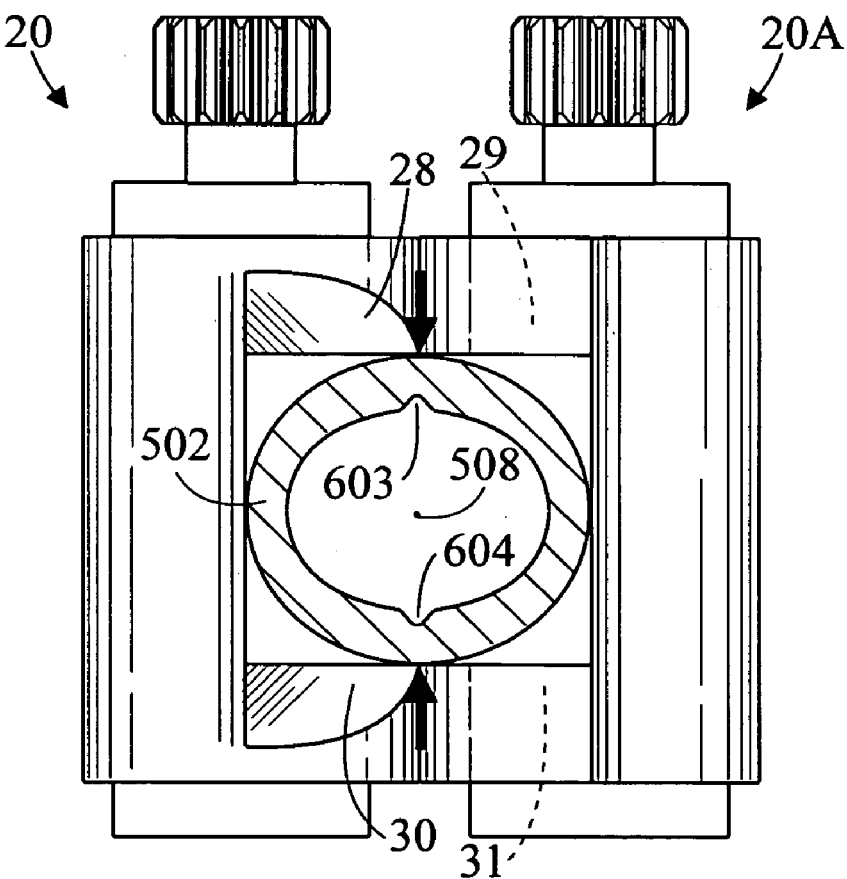

Now referring to FIG. 30, there is illustrated a side elevation view of an embodiment of the present invention which mitigates against the filling of slots 603 and 604. First cam assembly 20 and second cam assembly 20A are configured so that when they are in the shown open position, first (upper left) open cam 28, second (lower left) open cam 30, third (upper right) open cam 29, and fourth (lower right) open cam 31 have a slightly increased throw, the increase being at the portion of the cam positioned above the folds when in the most open position so as to urge sleeve 502 toward central longitudinal axis 508 so that a central cross section of sleeve 502 has an oval shape. This oval shape causes slots 603 and 604 to open up slightly and thereby be less susceptible to filling.

FIG. 23 is a reduced top plan view of a second embodiment of the present invention, showing sleeve 502 in a fully open state, the second embodiment pinch valve generally designated as 40. And, FIG. 28 is an enlarged partial perspective view of pinch valve 40. In this embodiment the close mechanism includes a first push pull member 42, a first link 44 having a first end 46, an opposite second end 48, and a first closure surface 50, first end 46 of first link 44 pivotally connected to first push pull member 42. A second link 52 having a first end 54, an opposite second end 56, and a second closure surface 58, first end 54 of second link 52 pivotally connected to first push pull member 42.

A second push pull member 60 is disposed opposite first push pull member 42. A third link 62 having a first end 64, an opposite second end 66, and a third closure surface 68, first end 64 of third link pivotally connected to second push pull member 60. A fourth link 70 having a first end 72, an opposite second end 74, and a fourth closure surface 76, first end 72 of fourth link 70 pivotally connected to second push pull member 60.

The close mechanism includes a first open follower 78 pivotally connected to second end 48 of first link 44 and to second end 66 of third link 62. A second open follower 80 is pivotally connected to second end 56 of second link 52 and to second end 74 of fourth link 70. Open followers 78 and 80 push against sleeve 502 during opening.

First link 44, second link 62, third link 62, and fourth link 70 comprise a four bar linkage which encircles sleeve 502. First push pull member 42 and second push pull member 60 may be moved together in directions 82 and 84 (refer to FIG. 24) to a closed position (refer to FIG. 25) wherein first side portion 504 and second side portion 506 of sleeve 502 are pinched together by first closure surface 50 and second closure surface 58 and third closure surface 68 and fourth closure surface 76 respectively.

FIG. 24 is a reduced top plan view of the pinch valve 40 showing sleeve 502 in a partially closed state.

FIG. 25 is a reduced top plan view of the pinch valve 40 showing sleeve 502 in a fully closed state.

Referring now to FIG. 26, there is illustrated a reduced top plan view of pinch valve 40, showing sleeve 502 in a partially open state. First push pull member 42 and second push pull member 60 may be moved apart in directions 86 and 88 to an open position wherein first open follower 78 and second open follower 80 push sleeve 502 toward centerline 502 in directions 90 and 91. In so doing the first side portion 504 and second side portion 506 are forced apart should they be stuck together or "set".

FIG. 27 is a reduced top plan view of the second embodiment showing sleeve 502 in a fully open state.

It may be appreciated that while the principles of the present invention have been applied to quarter-turn, mechanically actuated pinch-type valves with flexible resilient, plastic-lined or plastic only sleeves, for regulating or stopping the flow of a fluid, similar technology can be used for 180 degree reversing, 360 degree non-reversing or other single-turn actuation mechanisms.

The preferred embodiments of the invention described herein are exemplary and numerous modifications, variations, and rearrangements can be readily envisioned to achieve an equivalent result, all of which are intended to be embraced within the scope of the appended claims.

I claim:

1. A pinch valve comprising;
a housing;
a sleeve supported by said housing and defining a fluid flow path, said sleeve having a longitudinal axis generally parallel to said fluid flow path and defined as horizontal;
a valve actuating mechanism comprising;
opposing pinch assemblies mounted to said housing at opposite sides of said sleeve for quarter turn reversing open-close operation each of said pinch assemblies being rotatable in the same direction during opening and closing operation, about an axis defined as vertical that is transverse to the longitudinal axis of the sleeve each of said pinch assemblies comprising a space extending horizontally transverse of the sleeve through which a portion of the sleeve passes said space comprising a planar wall extending vertically parallel to the axis and having a height greater than the diameter of the sleeve and spaced from the sleeve in a fully open position and extending from lateral ends of the wall a cam surface that extends in a curve from one lateral end to the other lateral end reaching upon rotation a maximum inward traverse not later than one quarter turn of said pinch assemblies defining a close cam member pivotable upon a quarter turn rotation of the pinch assembly between an open position that does not pinch the sleeve, to a closed position by rotation of the pinch assemblies in the same direction to gradually pinch the sleeve to gradually form a closure in said sleeve each of the opposed pinch assemblies pinching half of the sleeve and said closure extending parallel to the axis of rotation of the pinch assemblies and defining an upper end and a lower end of the closure and said closure caused by each cam gradually approaching the other from opposite longitudinal directions;
each of said opposing pinch assemblies further comprising an upper open cam ramp positioned above the space defining an upper termination of said space and a lower open cam ramp positioned below the space defining a lower termination of the space each of said cam ramps being positioned and configured to contact and press upon the upper end and lower end respectively of said closure as the pinch assembly is pivoted from the closed position toward the open position to urge closure to open and said upper and lower open cam ramps remaining in contact with the sleeve during all of the open-close cycle of operation of the valve;
said valve actuating mechanism further comprising a gear at the top of each pinch assembly and an intermediate gear engaged with and between them and a means for rotating the intermediate gear one quarter turn to close the valve and a reverse one quarter turn to open the valve.

* * * * *